United States Patent
Nemoto et al.

(10) Patent No.: US 9,940,071 B2
(45) Date of Patent: Apr. 10, 2018

(54) MEMORY SYSTEM THAT CARRIES OUT AN ATOMIC WRITE OPERATION

(71) Applicant: Toshiba Memory Corporation, Tokyo (JP)

(72) Inventors: Hiroyuki Nemoto, Yokohama Kanagawa (JP); Shunitsu Kohara, Yokohama Kanagawa (JP); Kazuya Kitsunai, Fujisawa Kanagawa (JP); Satoshi Arai, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/243,654

(22) Filed: Aug. 22, 2016

(65) Prior Publication Data

US 2017/0160988 A1 Jun. 8, 2017

(30) Foreign Application Priority Data

Dec. 8, 2015 (JP) .................................. 2015-239265

(51) Int. Cl.
G11C 11/34 (2006.01)
G06F 13/28 (2006.01)
G06F 3/06 (2006.01)

(52) U.S. Cl.
CPC .......... *G06F 3/0659* (2013.01); *G06F 3/0619* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2006/0248282 A1* | 11/2006 | Rostampour | G06F 9/45537 711/141 |
| 2008/0263106 A1 | 10/2008 | Asherman et al. | |
| 2011/0029490 A1 | 2/2011 | Agarwal et al. | |
| 2012/0278293 A1 | 11/2012 | Bulkowski et al. | |
| 2013/0086330 A1* | 4/2013 | Baddepudi | G06F 12/0868 711/143 |
| 2014/0023159 A1 | 1/2014 | Huang et al. | |
| 2014/0237159 A9 | 8/2014 | Flynn et al. | |
| 2014/0281145 A1* | 9/2014 | Tomlin | G06F 12/0246 711/103 |
| 2014/0344530 A1 | 11/2014 | Sayyaparaju et al. | |

(Continued)

*Primary Examiner* — Harry W Byrne
*Assistant Examiner* — Sultana Begum
(74) *Attorney, Agent, or Firm* — Patterson & Sheridan, LLP

(57) ABSTRACT

A memory system includes a non-volatile memory and a controller circuit. The controller circuit is configured to carry out an atomic write operation in the non-volatile memory in response to an atomic write command, and selectively carry out one of a first operation and a second operation corresponding to address mapping between a logical address and a physical address of the non-volatile memory, along with the atomic write operation. When the first operation is selected, the controller circuit starts to update the address mapping after receiving a notification that writing of all data of the atomic write operation has been completed. When the second operation is carried out, the controller circuit starts to update the address mapping before receiving the notification.

20 Claims, 18 Drawing Sheets

(56) References Cited

U.S. PATENT DOCUMENTS

| | | |
|---|---|---|
| 2015/0052395 A1 | 2/2015 | Wipfel |
| 2015/0074336 A1 | 3/2015 | Nemoto et al. |
| 2015/0278293 A1 | 10/2015 | Swierk et al. |
| 2016/0070652 A1* | 3/2016 | Sundararaman ...... G06F 3/0619 711/154 |

* cited by examiner

VALID CLUSTER NUMBER
MANAGEMENT TABLE

| LOGICAL BLOCK NUMBER | VALID CLUSTER NUMBER |
|---|---|
| ⋮ | ⋮ |

FIG. 12

AW ATTRIBUTE MANAGEMENT TABLE                                    1431

| NSID | PRIORITY | AW MAXIMUM AMOUNT [KB] | AW TOTAL AMOUNT [KB] | ROLLBACK AMOUNT [KB] |
|---|---|---|---|---|
| 0 | MEDIUM |  | 6000 | 60 |
| 1 | MEDIUM |  | 3000 | 60 |
| 2 | MEDIUM |  | 100 | 10 |
| 3 | HIGH | 64 |  |  |
| 4 | HIGH | 32 |  |  |
| 5 | LOW |  |  |  |

FIG. 13

AW IMPLEMENTATION MANAGEMENT TABLE                        1432

| NSID | TagID | AW METHOD | AW AMOUNT [KB] |
|---|---|---|---|
| 0 | 5 | UPDATE POSTPONE | 6 |
| 2 | 28 | UPDATE POSTPONE | 4 |
| 2 | 10 | UPDATE POSTPONE | 8 |
| 3 | 64 | UPDATE POSTPONE | 5 |
| 5 | 79 | RECOVER |  |

MEMORY SYSTEM THAT CARRIES OUT AN ATOMIC WRITE OPERATION

CROSS-REFERENCE TO RELATED APPLICATION

This application is based upon and claims the benefit of priority from Japanese Patent Application No. 2015-239265, filed on Dec. 8, 2015, the entire contents of which are incorporated herein by reference.

FIELD

Embodiments described herein relate generally to a memory system, in particular, a memory system that carries out an atomic write operation.

BACKGROUND

Recently, memory systems including a non-volatile memory are becoming more widely used. A solid state drive (SSD) including a NAND-type flash memory is one type of such memory system. The SSD is used as the main storage in various information processing devices.

An Atomic Write function is known as a function employed to maintain consistency of data stored in a memory system. If a data write is requested as an Atomic Write, the entire data writing must be completed, or must be cancelled even after data are received and data writing has already started. After such cancellation, the memory system is returned to a state as if no data write request was received. The Atomic Write function guarantees that the state of the memory system returns (rolls back) to a state before the data write, if the data write is cancelled before completion. The rollback of the Atomic Write function is also referred to as cancellation of the Atomic Write. According to the Atomic Write function, if a data write is requested as Atomic Write, the data writing is entirely committed or entirely cancelled.

DESCRIPTION OF THE DRAWINGS

FIG. 4 illustrates a valid cluster number management table used in the memory system according to the embodiment.

FIG. 12 illustrates an AW (Atomic Write) attribute management table used in the memory system according to the embodiment.

FIG. 13 illustrates an AW implementation management table used in the memory system according to the embodiment.

DETAILED DESCRIPTION

A function of the Atomic Write which is requested to a memory system can vary depending upon, for example, types of application programs or the like. Hence, it is preferable that the memory system can appropriately control the performance in response to cancellation of the Atomic Write.

One or more embodiments provides a memory system that can appropriately control the performance in response to the cancellation of the Atomic Write.

According to an embodiment, a memory system includes a non-volatile memory and a controller circuit. The controller circuit is configured to carry out an atomic write operation in the non-volatile memory in response to an atomic write command, and selectively carry out one of a first operation and a second operation corresponding to address mapping between a logical address and a physical address of the non-volatile memory, along with the atomic write operation. When the first operation is carried out, the controller circuit starts to update the address mapping after receiving a notification that writing of all data of the atomic write operation has been completed. When the second operation is carries out, the controller circuit starts to update the address mapping before receiving the notification.

Hereinafter, embodiments will be described with reference to the drawings.

Figure 1:
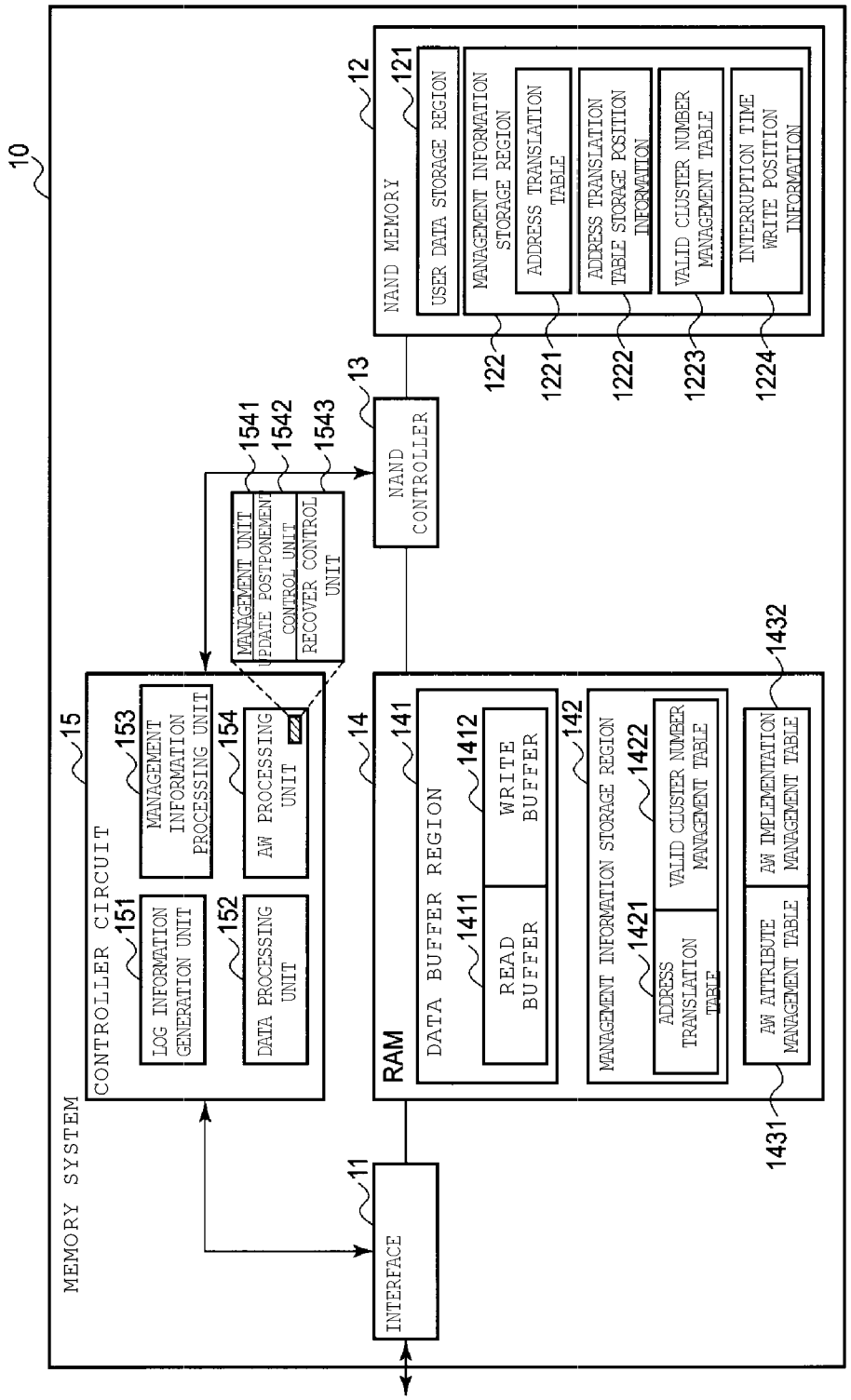
FIG. 1 illustrates a configuration of a memory system according to an embodiment.

FIG. 1 illustrates a configuration of a memory system according to an embodiment. The memory system 10 is, for example, an SSD. Hereinafter, it is assumed that a NAND type flash memory (hereinafter, referred to as a NAND memory) is used as a non-volatile memory. In addition, the memory system 10 according to the present embodiment includes an Atomic Write function.

The memory system 10 includes a host interface unit 11, a NAND memory 12 which is a first memory, a NAND controller 13, a random access memory (RAM) 14 which is a second memory, and a control unit (controller circuit) 15.

The host interface unit 11 is an interface between the memory system and a host device (not illustrated), such as a computer or a central processing unit (CPU) core. The interface can be serial attached SCSI (SAS), serial advanced technology attachment (SATA), PCI express (PCIe), in which NVM express (NVMe)® (Trade mark) that supports an Atomic Write function operates, or the like.

The NAND memory 12 is a recording medium in which data can be stored in a non-volatile manner, and is used as a storage unit for storing management information or the like, which is used to manage either user data or a program, or a stored position (recorded position) of data or the like in the memory system 10. Specifically, the NAND memory 12 includes a user data storage region 121 in which data or a program designated by a host device are stored, and a management information storage region 122 in which management information or the like that is used to manage a data record position in the NAND memory 12 is stored.

Figure 2:
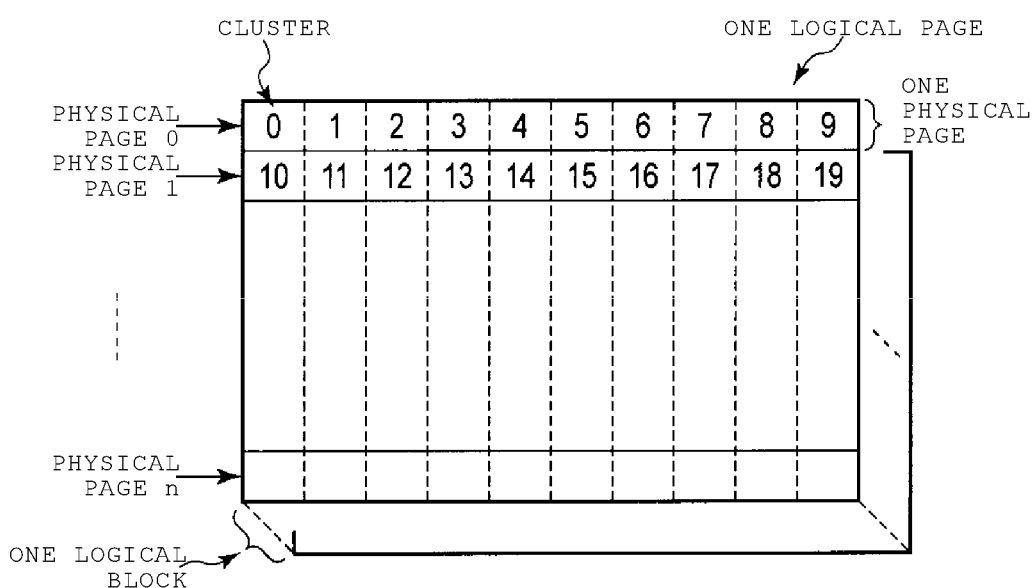
FIG. 2 schematically illustrates a data processing unit and a position management unit of a NAND memory in the memory system according to the embodiment.

FIG. 2 schematically illustrates a data processing unit and a position management unit of a NAND memory according to the present embodiment. In the NAND memory 12, multiple physical pages correspond to one logical page, and multiple logical pages correspond to one logical block. A write unit of data is one logical page, and more specifically, is a bank unit which forms one logical page.

In addition, a physical address is assigned to each cluster which is a unit smaller than one physical page. Hence, an address translation table which retains a correspondence between a logical address and physical address is managed in units of a cluster. A cluster size is, for example, a size equal to a multiple of a sector size which is the minimum unit of access from a host device, and, for example, a multiple of the cluster size equals to a physical page size. In FIG. 2, it is assumed that one physical page includes 10 clusters, and one logical page includes n physical pages (n is a natural number) of different NAND memories.

Returning to FIG. 1, the management information storage region 122 stores information which includes an address translation (mapping) table 1221, an address translation table storage position information 1222, a valid cluster number management table 1223, and an interruption time write position information 1224. The address translation table 1221 contains management information to manage a storage position of data in the NAND memory 12. The address translation table storage position information 1222 indicates a storage position of the address translation table 1221. The valid cluster number management table 1223 represents valid cluster number of each logical block. The interruption time write position information 1224 is a final physical address in which user data were written when power supply of the memory system 10 is disconnected, a host interface is disconnected, or factors (hereinafter, referred to as a write interruption factor) to interrupt write such as abort request occurs.

Figure 3:
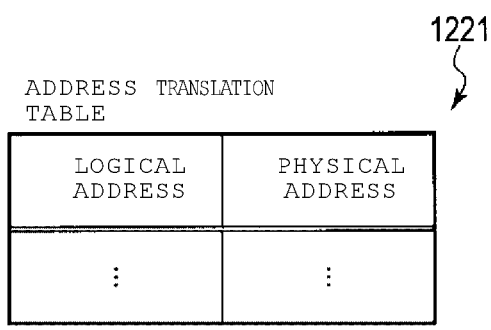
FIG. 3 illustrates an address translation table used in the memory system according to the embodiment.

FIG. 3 illustrates an example of the address translation table as management information. The NAND memory 12 manages storage positions of data by a cluster unit. The address translation table 1221 stores a correspondence of logical addresses for the data of a cluster unit with respect to physical data recording positions of the data, that is, physical address. The logical address is an address which is used for specifying a position in a logical address space of the data of the memory system that is viewed from a host. In addition, the physical address is an address which is physically assigned to each cluster of the NAND memory 12.

FIG. 4 illustrates an example of the valid cluster number management table. The NAND memory 12 manages the number of clusters (valid clusters) in which valid data are stored by a logical block unit. The valid cluster number management table 1223 indicates a correspondence of an identifier (logical block number) assigned to each logical block of the NAND memory 12 with respect to a valid cluster number (i.e., the number of valid clusters existing in the logical block).

The NAND controller 13 performs interface processing with the NAND memory 12. Here, detailed description will be omitted, but the NAND controller 13 performs error correction processing or processing such as an access control between the NAND memory 12 and the RAM 14.

Returning to FIG. 1, the RAM 14 includes a data buffer region 141 which functions as a buffer for data transfer between a host device and the NAND memory 12, or a buffer for temporarily storing data that are internally transferred in the NAND memory 12, and a management information storage region 142 which stores management information to manage storage positions of data in the NAND memory 12. The data buffer region 141 includes a read buffer 1411 which temporarily stores data read from the NAND memory 12 in response to a read request that is received from a host device, and a write buffer 1412 which temporarily stores write data to the NAND memory 12 in response to a write request that is received from the host device.

The management information storage region 142 includes an address translation (mapping) table 1421 and a valid cluster number management table 1422, as management information to manage storage positions of data in the NAND memory 12 as described above. The address translation table 1421 is generated by reading a part or all of data stored in the address translation table 1221 of the NAND memory 12 into the management information storage region 142 of the RAM 14, when the memory system 10 starts up. Similarly, the valid cluster number management table 1422 is generated by reading data stored in the valid cluster number management table 1223 of the NAND memory 12 into the management information storage region 142 of the RAM 14, when the memory system 10 starts up.

The RAM 14 also stores an Atomic Write (AW) attribute management table 1431 and an AW implementation management table 1432, which will be described below.

In the present embodiment, every time a data recording position (correspondence between a logical address and a physical address) changes upon data write to the NAND memory 12, or erasing of data stored in the NAND memory 12, the management information of the RAM 14 is updated. Since a change difference with respect to management information stored in the NAND memory 12 is stored as a log, the management information can also be restored even if a write interruption occurs. In addition, the management information stored in the RAM 14 is transferred to the NAND memory 12, at a predetermined timing, for example, when power supply to the memory system 10 is discontinued.

A dynamic RAM (DRAM), a static RAM (SRAM), a ferroelectric RAM (FeRAM), a magnetoresistive RAM (MRAM), a phase change RAM (PRAM), or the like can be used as the RAM 14.

The control unit 15 performs control processing for data transfer between a host device and the NAND memory 12, processing for data management within the NAND memory 12, or the like. The control unit 15 includes a log information generation unit 151, a data processing unit 152, a management information processing unit 153, and an Atomic Write (AW) processing unit 154.

The log information generation unit 151 generates log information including a write log, which represents a correspondence between a logical address and a physical address when data are written to the NAND memory 12 in unit of a cluster, for each logical page. The log information also represents the changed content of the address translation table 1421. In the present embodiment, even when the Atomic Write is cancelled, the write log includes information which enables the management information to be updated to the one that assumes no Atomic Write.

Figure 5:
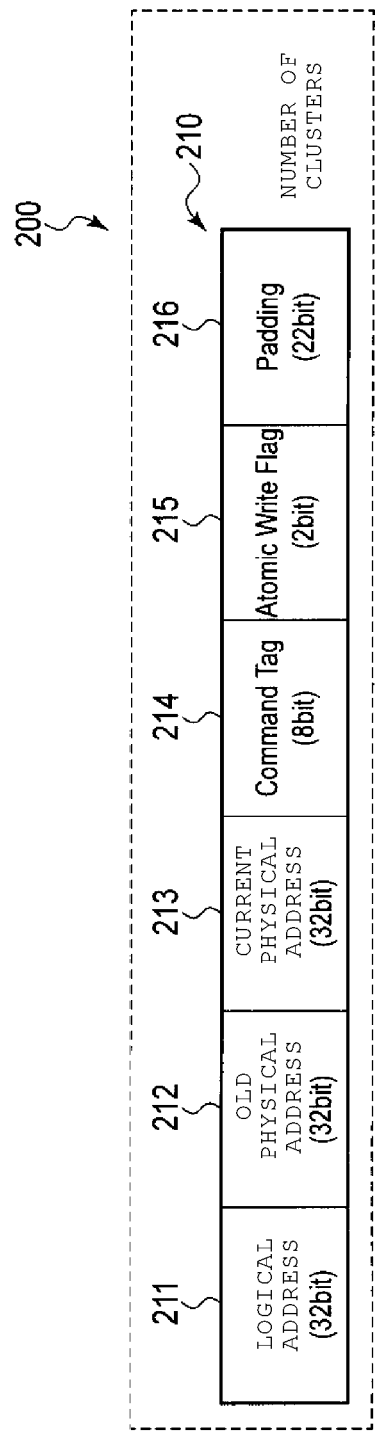
FIG. 5 schematically illustrates log information according to the embodiment.

FIG. 5 illustrates an example of log information according to the present embodiment. A write log 210 is generated for each cluster. Hence, the write logs 210 corresponding to the number of clusters included in one physical page are generated for one physical page. The log information 200 includes the write logs 210 corresponding to one logical page. The log information 200 is written to one cluster in one physical page. Each write log 210 includes a logical address 211, an old physical address 212, a current physical address 213, a command tag 214, an Atomic Write flag 215, and padding data 216.

The logical address 211 is assigned by a cluster unit in a logical address space. The old physical address 212 and the current physical address 213 represent physical addresses before and after data are written with respect to the logical address 211, when data write is performed (not limited to Atomic Write). That is, the old physical address 212 is a physical address corresponding to the logical address 211 before data have been written, and the current physical address 213 is a physical address corresponding to a logical address after data have been written. The logical address 211, the old physical address 212, and the current physical address 213 are recorded in a write log used in a memory system that includes a general NAND memory. Sizes of the logical address 211, the old physical address 212, and the current physical address 213 can be, for example, 32 bits, respectively.

The command tag 214 is an identification number (identifier) which is assigned each time a command (regardless of whether or not the command is a write command, and whether or not the command is Atomic Write) is issued. It is assumed that the identification numbers of commands which are simultaneously issued do not overlap each other. The size of the command tag 214 can be, for example, eight bits.

The Atomic Write flag 215 represents whether or not the command (write command) is Atomic Write, and includes a start flag which is attached to a first cluster of data of which write is requested as Atomic Write, and an end flag which is attached to a final cluster of the data. Even if data are requested to be written as Atomic Write, no flag is attached to clusters other than the first cluster and the final cluster. A write command of Atomic Write may also be issued with respect to data having a size less than one cluster, and thus, the Atomic Write flag 215 can include a start bit and an end bit that can be attached to one cluster, i.e., two bits.

When a write command is issued, the log information generation unit 151 writes the logical address 211, the old physical address 212, and the current physical address 213 to the write log 210, and also, stores the identification number of the write command in the command tag 214. In addition, when the write command is the Atomic Write and a data unit written to the logical address 211 is a head cluster of the data designated by the write command, a start flag is set in the Atomic Write flag 215. When the data unit is a final cluster, an end flag is set in the Atomic Write flag 215. When the write command is not for Atomic Write, and when the write command is for the Atomic Write but the data unit written to the logical address 211 is a cluster other than the first and final clusters of the data designated by the write command, neither the start flag nor the end flag is set in the Atomic Write flag 215.

The padding data 216 are data added so as to make the write log 210 a predetermined size. The size of the padding data can be set as 22 bits, if the size of the write log 210 is set as, for example, 128 bits.

Here, an overview of the Atomic Write will be described with reference to FIG. 6 and FIG. 7.

Figure 6:
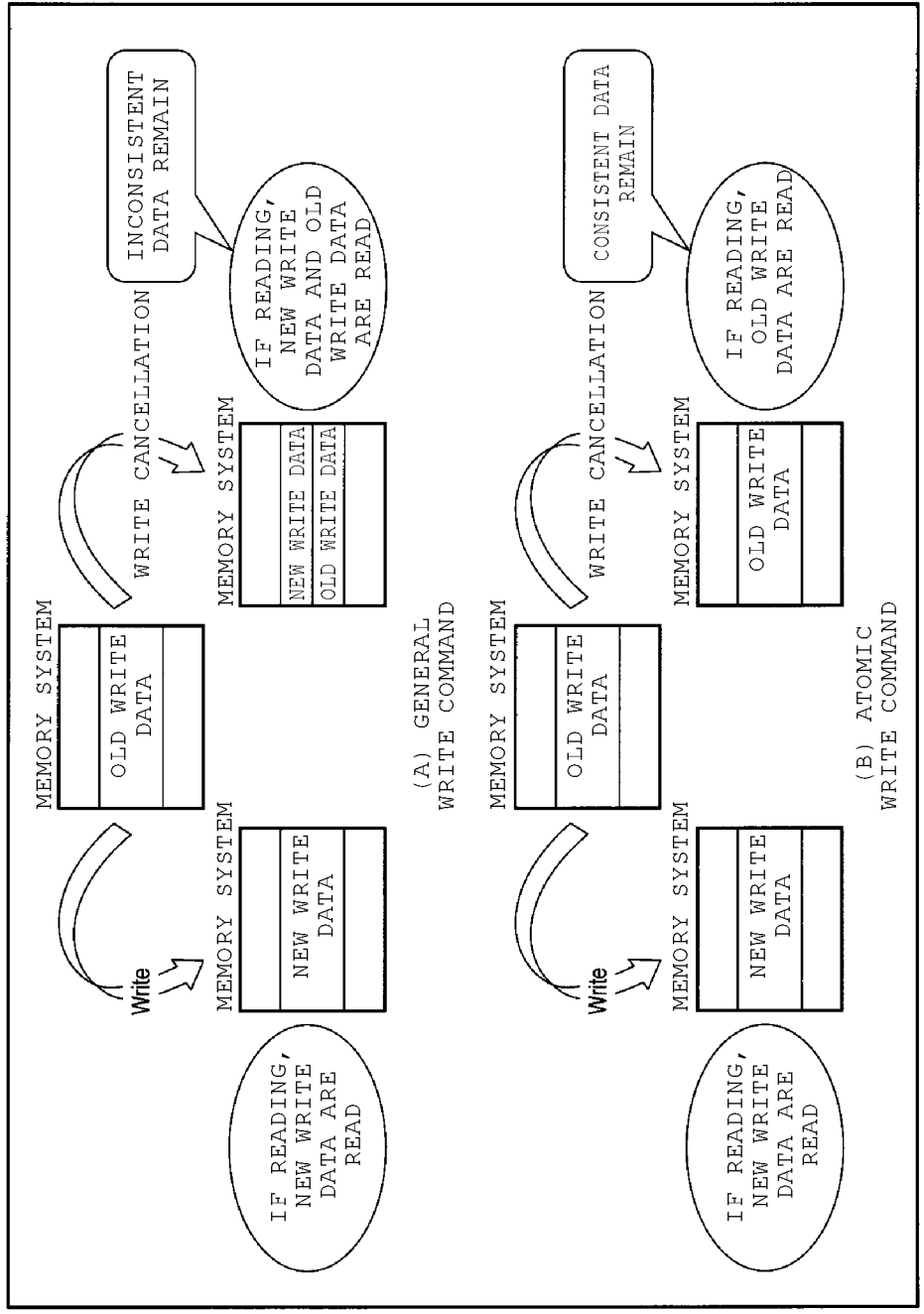
FIG. 6 is a conceptual diagram illustrating a difference between a normal write and an Atomic Write.

FIG. 6 is conceptual diagram illustrating a difference between a normal write command (general write command) and a write command of Atomic Write (Atomic Write command).

As illustrated in FIG. 6, after data write has been completed in response to both of a general write command and an Atomic Write command, that is, after old write data have been completely replaced with new write data, the new write data are read in response to a read command received thereafter.

Meanwhile, if the data write is cancelled during the data write, more specifically, while old write data are being replaced with new write data, there is a difference between the data write in response to the general write command and the one in response to the Atomic Write command, in terms of the data read carried out thereafter. As illustrated in (A) of FIG. 6, in a case of the general write command, a portion of the new write data which has been written and a portion of the old write data which has not been replaced are read. Accordingly, in the case of the general write command, consistency of data may be lost by cancelling the data write.

In contrast to this, in a case of the Atomic Write command, as illustrated in (B) of FIG. 6, rollback (Atomic Write cancel) is performed in accordance with cancellation of the data write such that there is no replacement of the old write data with the new write data. As a result, the old write data are read. That is, in the case of the Atomic Write command, even if the data write is cancelled during the data write, the consistency of data is maintained.

Figure 7:
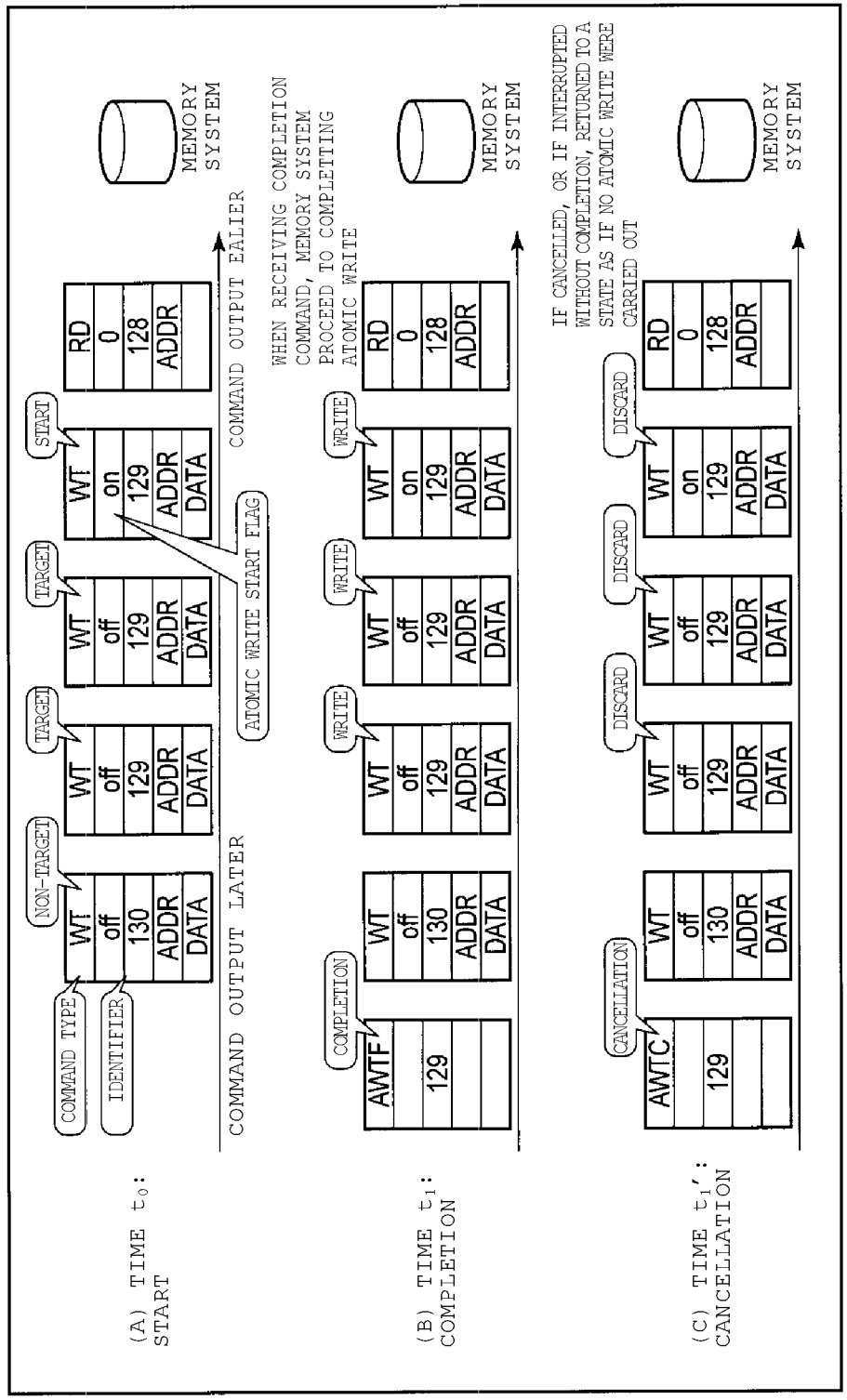
FIG. 7 illustrates an operation example of the Atomic Write.

FIG. 7 schematically illustrates a basic operation of the Atomic Write.

First, it is assumed that a host device sequentially issues a read command, an Atomic Write command, a general write command, as illustrated in (A) of FIG. 7. An identifier "128" is attached to the read command, an identifier "129" is attached to the Atomic Write command, and an identifier "130" is attached to the general write command. In addition, an Atomic Write start flag is attached to a first Atomic Write command with the identifier "129". In other word, by attaching the Atomic Write start flag, the write command with the identifier "129" can be identified as the Atomic Write command.

Subsequently, as illustrated in (B) of FIG. 7, it is assumed that completion (Atomic Write finish) of the Atomic Write command with the identifier "129" is notified from a host device. In accordance with the notification, it is determined that cancellation of the Atomic Write command with the identifier "129" no longer occurs. In this case, the old write data are fully replaced with the new write data (transferred along with the Atomic Write command with the identifier "129"), as illustrated in (B) of FIG. 6.

In (C) of FIG. 7, it is assumed that cancellation (Atomic Write cancellation) of the Atomic Write command with the identifier "129" is notified from the host device. In this case, the new write data transferred along with the Atomic Write command with the identifier "129" are discarded, and rollback to the old write data is performed, as illustrated in (B) of FIG. 6.

In addition, also if an event to cause a write interruption occurs during the Atomic Write, the rollback is performed subsequent to the interrupted Atomic Write.

In this way, data designated to be written by the Atomic Write command are completely written or not written at all. The Atomic Write is defined by, for example, an NVM EXPRESS specification.

FIG. 1 is referred to again.

The data processing unit 152 performs processing of data reading from the NAND memory 12, data writing to the NAND memory 12, or the like, in response to a read request or a write request from the host device. When data are written, both write data and log information corresponding to the write data are written to a physical page included in a logical page of write destination. The log information is written to a cluster (for example, a final cluster) at a predetermined position of a logical page.

The management information processing unit 153 operates such that management information which is modified upon data write to the NAND memory 12 or the like becomes the latest information. For example, if a physical address corresponding to a logical address of data changes in accordance with the data write to the NAND memory 12, the address translation table 1421 is updated such that the logical address is mapped to a new data record position (physical address). In addition, a change of the number of valid clusters in a logical block in accordance with data write to the NAND memory 12 or the like is recorded in the valid cluster number management table 1422. The management information processing unit 153 cooperates with the AW processing unit 154 in updating the address translation table 1421.

When an event to cause interruption of the data write occurs, the management information processing unit 153 operates to save data in the address translation table 1421 and the valid cluster number management table 1422 in the address translation table 1221 and the valid cluster number management table 1223, respectively, and save the address translation table storage position information 1222 and the interruption time write position information 1224 in the NAND memory 12. With respect to the address translation table 1421, if the difference from the data stored in the address translation table 1221 exceeds a certain threshold, a write operation is appropriately performed. If there is further data to be saved, the data are saved in the NAND memory 12.

If the Atomic Write is cancelled or an event to cause the interruption of the data write occurs during the Atomic Write, the AW processing unit 154 performs processing for recovering the state of the NAND memory 12 to a state before the Atomic Write is performed. More specifically, the AW processing unit 154 performs processing for restoring the address translation table 1421 to a state before the Atomic Write by cooperating with the management information processing unit 153. The AW processing unit 154 includes a management unit 1541, an update postponement control unit 1542, and a recovering control unit 1543. Detailed description thereof will be made below.

As described above, the memory system 10 according to the present embodiment has a function to carry out the Atomic Write. In addition, the Atomic Write includes two processing methods: a "look up table (LUT) update postponing method"; and a "LUT recovering method". The LUT corresponds to an address translation table. Thus, the memory system 10 according to the present embodiment adaptively selects one of the two methods to carry out the Atomic Write, and this will be described in detail hereinafter.

First, the two methods to carry out the Atomic Write (the "LUT update postponing method" and the "LUT recovering method") will be described with reference to FIG. 8 and FIG. 9.

Figure 8:
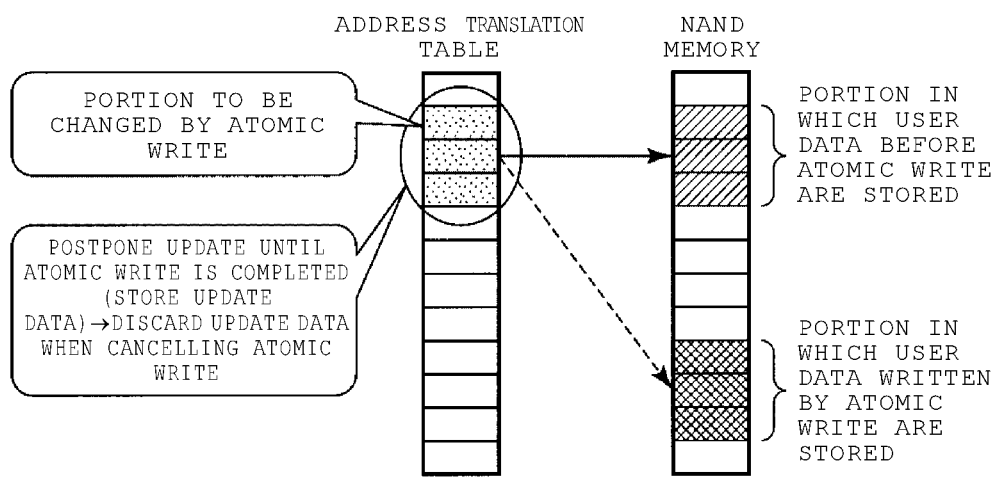
FIG. 8 illustrates an overview of an LUT update postponing method employed for cancellation of the Atomic Write carried out in the memory system according to the embodiment.

FIG. 8 schematically illustrates an overview of the LUT update postponing method.

In the LUT update postponing method, updating of the address translation table for replacing an old physical address before the data write corresponding to the logical address designated by the Atomic Write command with a new physical address after the data write is not carried out until the Atomic Write is completed. At this time, update data of the address translation table including at least the logical address and the new physical address is generated and stored in, for example, the RAM 14 or the like. If the Atomic Write is completed, updating of the address translation table is performed based on the update data stored in the RAM 14 or the like. Meanwhile, if the Atomic Write is cancelled, the update data stored in the RAM 14 or the like is discarded. Accordingly, the address translation table is maintained in a state before the Atomic Write. More specifically, the old physical address before data write is mapped to the logical address designated by the Atomic Write command. The update postponing control unit 1542 of the AW processing unit 154 is a processing unit responsible for carrying out the LUT update postponing method. Specifically, the update postponing control unit 1542 causes the management information processing unit 153 to postpone the update of the address translation table in accordance with the Atomic Write, and to perform the update of the address translation table when the Atomic Write is completed.

According to the LUT update postponing method, if the Atomic Write is cancelled, an operation to be performed is only discarding the update data of the address translation table, which enables a quicker rollback and a quicker cancellation of the Atomic Write. Meanwhile, it is necessary to store the update data of the address translation table in accordance with the Atomic Write that has not been completed, and thus, costs to provide storage space of the update data, such as the RAM 14 or the like are required.

Figure 9:
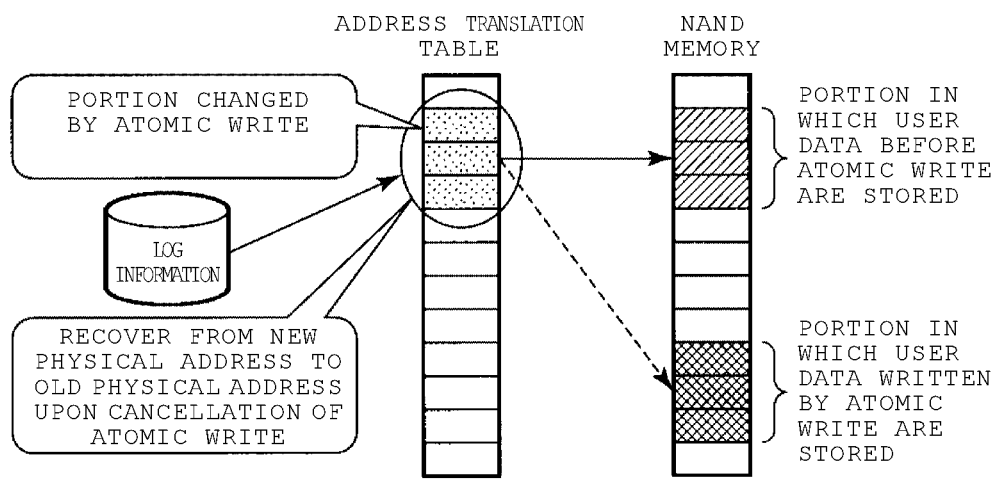
FIG. 9 illustrates an overview of an LUT recovering method employed for cancellation of the Atomic Write carried out in the memory system according to the embodiment.

FIG. 9 schematically illustrates an overview of the LUT recovering method.

According to the LUT recovering method, updating of the address translation table for replacing an old physical address before the data write corresponding to the logical address designated by the Atomic Write command with a new physical address after the data write is carried out without postponement. Then, if the Atomic Write is cancelled, the address translation table is recovered to a state before the Atomic Write, based on the log information. More specifically, the address translation table is updated to a state so that the old physical address before the data write corresponds to the logical address designated by the Atomic Write command. The recovering control unit 1543 of the AW processing unit 154 is a processing unit which is responsible for carrying out the LUT recovering method. The log information is written along with data from a host device, when the data are written to the NAND memory 12.

According to the LUT recovering method, if the Atomic Write is cancelled, it is necessary to recover the address translation table to the previous state based on the log information, which causes rollback and the cancellation of the Atomic Write to be slower. Meanwhile, since it is unnecessary to store the update data of the address translation table in accordance with the Atomic Write that has not been completed, costs for the storage space of the update data, such as the RAM 14 or the like can be saved. In addition, the LUT recovering method requires no additional operation if the Atomic Write is completed.

Furthermore, the LUT recovering method includes two operational methods: a "reverse-direction method"; and a "forward-direction method". These two methods will be described with reference to FIG. 10.

Figure 10:
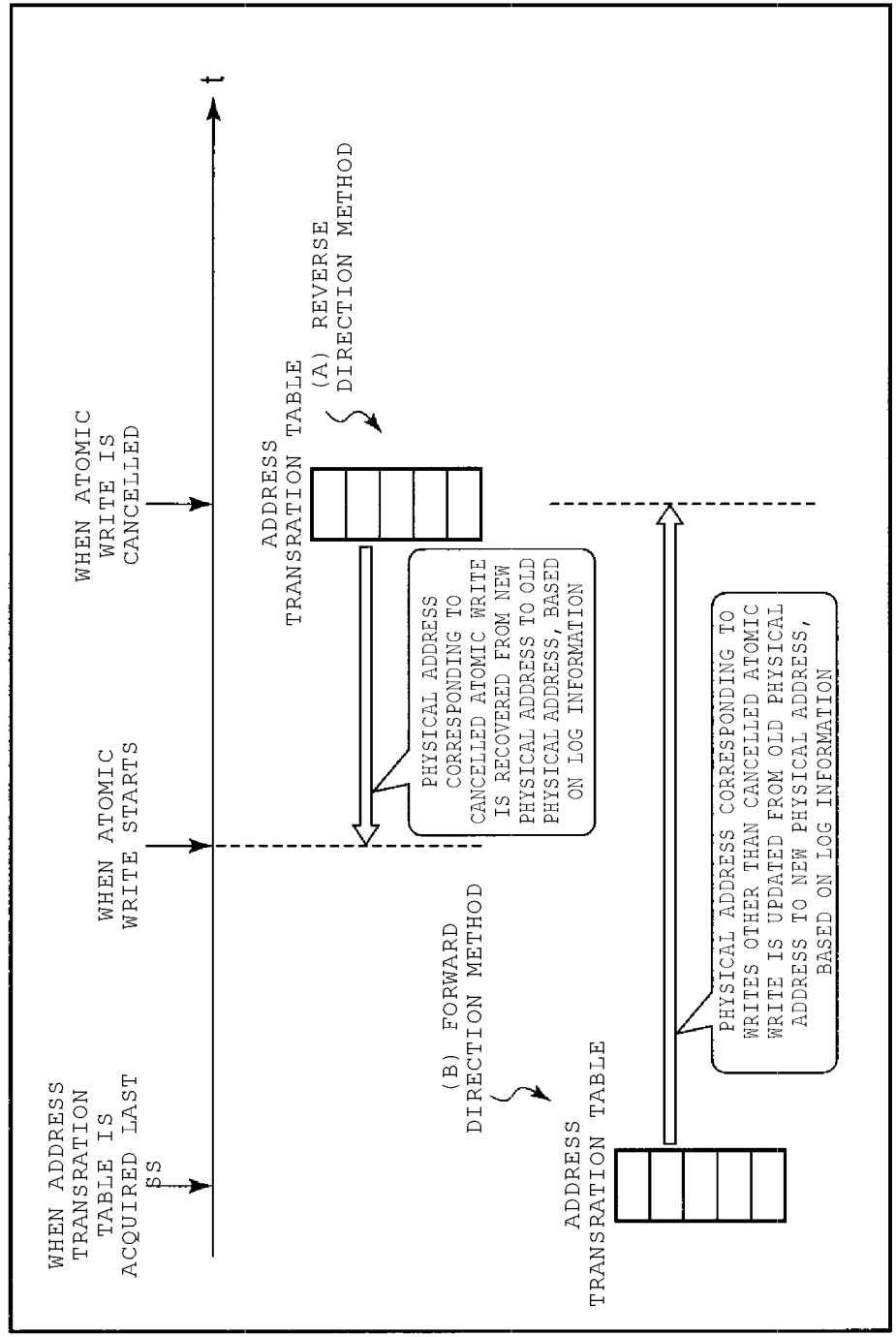
FIG. 10 illustrates an overview of two methods (a reverse direction method and a forward direction method) to implement the LUT recovering method.

According to the reverse-direction method illustrated in (A) of FIG. 10, a new physical address after the data write is replaced with an old physical address before the data write, such that the old physical address corresponds to the logical address designated by the Atomic Write command, based on the address translation table when the Atomic Write is cancelled, by referring to the log information back from the latest to the start time of the cancelled Atomic Write.

Meanwhile, the forward direction method illustrated in (B) of FIG. 10 is based on the address translation table which is persisted before the cancelled Atomic Write started. As described above, in the address translation table, the management information processing unit 153 appropriately performs a write operation to the NAND memory 12, if the amount of difference between the address translation table 1421 in the RAM 14 and the address translation table 1221 in the NAND memory 12 exceeds a certain threshold. The persisted address translation table refers to an address translation table that reflects such update, and is referred to as a snap shot (SS) of the address translation table. In this way, the persisted address translation table is read, log information is referred to in a forward direction from the time when the write operation is started (when snapshot is taken) to the latest, and an old physical address before the data write is replaced with a new physical address after the data write so that the new physical address corresponds to the logical address designated by Atomic Write commands other than the Atomic Write command for which data write has been cancelled or general write commands.

The LUT recovering method can employ either one of the reverse direction method and the forward direction method. However, the forward direction method does not need the old physical address before the data write. The forward direction method is useful, when there is no opportunity to acquire the old physical address at the time of data write and the old physical address is rarely recorded as the log information.

As described above, the LUT update postponing method has merits of quicker cancellation of the Atomic Write and demerits of higher costs to perform the method, and the LUT recovering method has merits of lower costs in performing the method and demerits of slower cancellation of the Atomic Write. In addition, the speed to cancel the Atomic Write requested to the memory system can differ depending upon, for example, the type of application program that uses the memory system or the like. In the memory system 10 according to the present embodiment, either one of the LUT update postponing method and the LUT recovering method is adaptively selected. The management unit 1541 of the AW processing unit 154 is a processing unit responsible for selecting one of the LUT update postponing method and the LUT recovering method through a predetermined process described below.

Here, the LUT update postponing method by which updating of the address translation table (in accordance with data write from a host device to the NAND memory 12) is postponed is described as one of the two Atomic Write processing methods. However, instead, it is also possible to employ a method of postponing the data write itself.

The memory system 10 according to the present embodiment logically divides the storage region of the NAND memory 12 for user data into multiple regions, based on the instruction from a host device, that is, divides a logical address space into multiple spaces. In other words, the host device uses the divided storage regions of the memory system 10. Each divided region is associated with a namespace (NS) or the like, and a unique identifier (NSID) is attached to each region. The host device performs data access to a target namespace, designating the NSID. The management unit 1541 receives setting information regarding performance of the cancellation of the Atomic Write from the host device for each namespace, in advance, and adaptively selects the LUT update postponing method or the LUT recovering method during the requested Atomic Write, based on the setting information.

Figure 11:
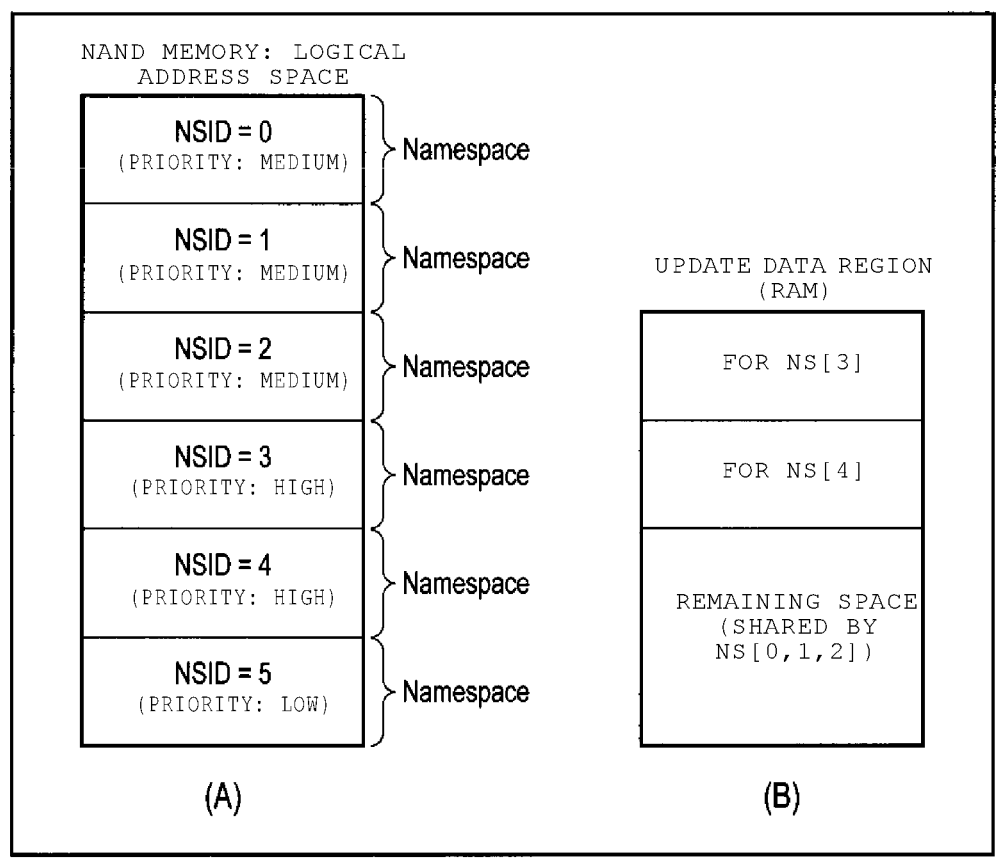
FIG. 11 illustrates a concept of namespace and a storage region (NAND memory and RAM region for update storage) of the memory system that is divided into multiple regions.

As illustrated in (A) of FIG. 11, it is assumed that a logical address space is divided into six namespaces by the host device. NSIDs from "0" to "5" are assigned to namespaces. In addition, it is assumed that: (1) priority "high" is set to a namespace of NSID "3" (NS "3") and a namespace of NSID "4" (NS "4") as setting regarding the cancellation of the Atomic Write; (2) priority "medium" is set to a namespace of NSID "0" (NS "0"), a namespace of NSID "1" (NS "1"), and a namespace of NSID "2" (NS "2") as the setting regarding the cancellation of the Atomic Write; and (3) priority "low" is set to a namespace of NSID "5" (NS "5") as the setting regarding the cancellation of the Atomic Write, by the host device. The namespaces to which the priority "high" is set are storage regions which are used by, for example, an application program that requires a quicker cancellation of the Atomic Write. The namespace to which the priority "low" is set is a storage region which is used by, for example, an application program that does not require a quicker cancellation of the Atomic Write. The namespaces to which the priority "medium" is set are storage regions which are used by for example, an application program that requires a quick cancellation of the Atomic Write to some extent. In addition, in an environment in which a plurality of virtual machines are established in the host device and each namespace is used by one of different virtual machines, the setting for the cancellation of the Atomic Write may be performed for each virtual machine. Furthermore, an initial setting for the cancellation of the Atomic Write may be set as priority "medium", and thus the namespace for which the setting for the cancellation of the Atomic Write is not performed by the host device may be set to priority "medium".

The management unit 1541 selects the LUT update postponing method for the Atomic Write with respect to the namespace for which priority "high" is set. As described above, according to the LUT update postponing method, updating of the address translation table in accordance with the Atomic Write is postponed until the requested Atomic Write is completed. For this reason, according to the LUT update postponing method, update data of the address translation table which includes at least the logical address and the new physical address are generated and stored in an update data region which is secured in the RAM 14. If the management unit 1541 receives setting of priority "high" from the host device as setting regarding the cancellation of the Atomic Write for a certain namespace, the management unit 1541 receives together designation of the allowable amount of update data of the address translation table regarding the Atomic Write with respect to the namespace. If the allowable amount of accumulation is not secured in the update data region, the management unit 1541 replies with an error to the host device. Here, it is assumed that the update data region is sufficiently secured for each of the NS "3" and NS "4" to which priority "high" is set, as illustrated in FIG. 11.

In addition, the management unit 1541 selects the LUT recovering method for the Atomic Write with respect to the namespace to which priority "low" is set. Then, the management unit 1541 adaptively selects one of the LUT update postponing method and the LUT recovering method, based on a use situation of the update data region, more specifically, available space of the update data region for the namespace to which priority "medium" is set. As illustrated in FIG. 11, an empty space (remainder) of the update data region, that is, a region other than a region assigned to the namespace to which priority "high" is set is used for the namespaces (NS "0", NS "1", NS "2") to which priority "medium" is set.

That is, the management unit 1541 adaptively selects the LUT update postponing method or the LUT recovering method for the requested Atomic Write, based on an implementation situation of the Atomic Write.

The selection of the LUT update postponing method or the LUT recovering method based on setting regarding the cancellation of the Atomic Write is employed for namespaces for which priority "medium" is set in the present embodiment, but the selection may be carried out for other namespaces. For example, the management unit 1541 may adaptively select the LUT update postponing method or the LUT recovering method, based on the implementation situation of the Atomic Write, with respect to all namespaces.

The management unit 1541 manages the AW attribute management table 1431 and the AW implementation management table 1432. As described above, these tables are stored in the RAM 14.

FIG. 12 illustrates an example of the AW attribute management table 1431. When the host device performs setting regarding the cancellation of the Atomic Write with respect to a certain namespace, the management unit 1541 adds an entry for the namespace to the AW attribute management table 1431. As illustrated in FIG. 12, each entry in the AW attribute management table 1431 includes an "NSID" field, a "priority" field, an "AW maximum amount" field, an "AW total amount" field, and a "rollback amount" field.

Identifiers of the namespaces are stored in the "NSID" field. Values indicating any one of the priority "high", the priority "medium", and the priority "low" which are set by the host device are stored in the "priority" field. An allowable amount of update data of the address translation table (such that update of address translation table can be postponed), which is designated by the host device at the time of setting of the priority "high", is stored in the "AW maximum amount" field. A total amount of update data of the address translation table that have been generated in accordance with Atomic Writes with respect to the namespace to which the priority "medium" is set is stored in the "AW total amount" field. A total amount of update data of the address translation table regarding cancelled Atomic Writes with respect to the namespace to which the priority "medium" is set is stored in the "rollback amount" field. Values of the "AW total amount" field and the "rollback amount" field are appropriately updated (more specifically, added in response to each command) by the management unit 1541 in accordance with implementation of the Atomic Write with respect to the namespace. To prevent unlimitedly increasing values of the "AW total amount" field and the "rollback amount" field, a moving average in which the old is thrown away for a predetermined time interval may be employed. Note that processing such as, resetting (becoming zero) for a predetermined time interval, dividing using a constant, or subtracting using a constant may be employed.

In addition, FIG. 13 illustrates an example of the AW implementation management table 1432. The management unit 1541 adds an entry corresponding to a data write into the AW implementation management table 1432, when the host device requests the data write of an Atomic Write. As illustrated in FIG. 13, each entry in the AW implementation management table 1432 includes the "NSID" field, a "TagID" field, an "AW method" field, and the "AW amount" field. Each entry in the AW implementation management table 1432 is deleted when the data write is completed or cancellation of the data write is completed.

An identifier of the namespace which is designated as a data write destination is stored in the "NSID" field. An identification number (identifier) which is attached to a command for the data write is stored in the "TagID" field. A value indicating one of the LUT update postponing method and the LUT recovering method which is employed for the data write is stored in the "AW method" field. The amount of update data of the address translation table which is generated by the Atomic Write for the data write of which cancellation employs the LUT update postponing method is stored in the "AW amount" field. Values of each field are appropriately updated by the management unit 1541, in accordance with implementation of the Atomic Write.

Subsequently, an operation in which the management unit 1541 adaptively selects the LUT update postponing method or the LUT recovering method for cancellation of the Atomic Write which is requested from the host device using the AW attribute management table 1431 and the AW implementation management table 1432 will be described.

When the Atomic Write is requested, the management unit 1541 first examines which one of priority "high", priority "medium", and priority "low" is set for the namespace designated as a write destination of the Atomic Write, with reference to the AW attribute management table 1431. As described above, the management unit 1541 selects the LUT update postponing method, for the Atomic Write with respect to the namespace to which priority "high" is set, and selects the LUT recovering method, for the Atomic Write with respect to the namespace to which priority "low" is set.

In a case of the Atomic Write with respect to the namespace to which priority "medium" is set, subsequently, the management unit 1541 determines whether or not an empty capacity greater than or equal to the amount of update data of the address translation table which is derived from, for example, the size of write data and is requested by the Atomic Write command exists in the update data region of the RAM 14. If the empty capacity exists, the management unit 1541 secures a region of the RAM 14 as the update data region, and selects LUT update postponing method for the Atomic Write. If the empty capacity does not exist, the management unit 1541 changes a method of the cancellation set for another Atomic Write with respect to namespace to which priority "medium" is set, from the LUT update postponing method to the LUT recovering method. The management unit 1541 secures a region greater than or equal to the requested capacity in the update data region, by releasing a region secured for another Atomic Write, and employs the LUT update postponing method. An operation of the management unit 1541 in this case will be described in detail with reference to FIG. 14.

Figure 14:
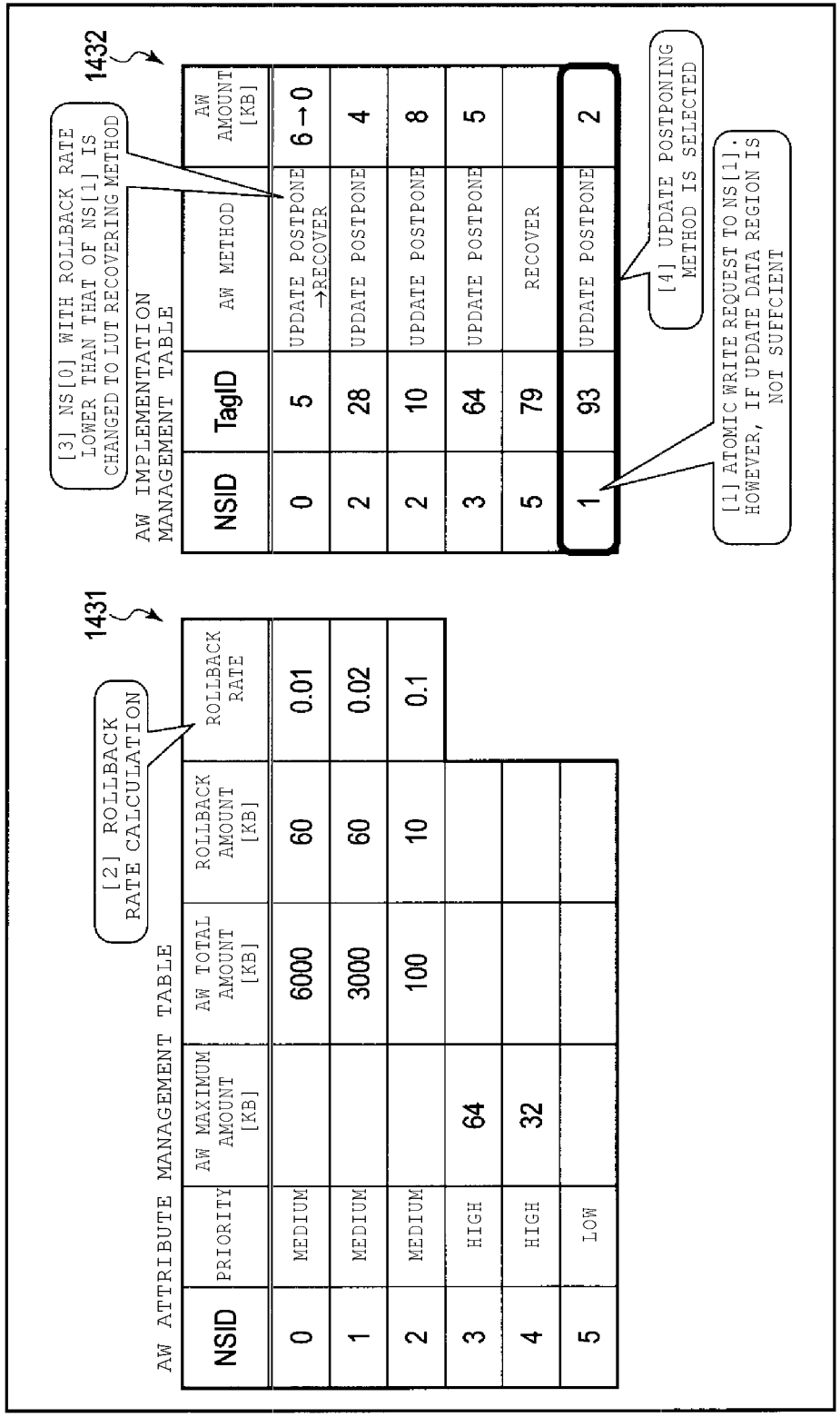
FIG. 14 illustrates an operation of selecting the LUT update postponing method or the LUT recovering method carried out in the memory system according to the embodiment.

Here, it is assumed that the Atomic Write (TagID "93") with respect to the NS "1", which is the namespace to which priority "medium" is set, is requested from the host device, and a region for the Atomic Write cannot be secured in the update data region ("1" of FIG. 14). In addition, at this time, it is assumed that one Atomic Write (TagID "5") is being performed with respect to the NS "0", which is another namespace to which priority "medium" is set, and two Atomic Writes (TagID "28" and TagID "10") are being performed with respect to the NS "2".

In this situation, the management unit 1541 first calculates the rollback rate with respect to each namespace to which priority "medium" is set and to which the Atomic Write is performed and the LUT update postponing method is set ("2" of FIG. 14). The rollback rate represents a possibility that cancellation of the Atomic Write occurs, and is obtained by dividing the amount of rollback which is recorded in the AW attribute management table 1431 by an AW total amount which is recorded in the AW attribute management table 1431. Here, values of 0.01 (60/6000), 0.02 (60/3000), and 0.1 (10/100) are respectively calculated for NS "0", NS "1", and NS "2". It is also possible to calculate the rollback rate based on the number of commands, without using the amount of data. That is, the rollback rate may be calculated by dividing the number of Atomic Write commands subjected to cancellation by a total number of Atomic Write commands.

Subsequently, the management unit 1541 determines whether or not another namespace having a rollback rate lower than the namespace for which the Atomic Write is requested exists. If another namespace exists, the Atomic Write with respect to the namespace that has the lower rollback rate is less likely to be cancelled than the newly requested Atomic Write, thus the cancellation method for the namespace is changed to the LUT recovering method ("3" of FIG. 14). Here, the rollback rate of NS "1" is 0.02, and the rollback rate of NS "0" is 0.01. Accordingly, the cancellation method of the Atomic Write (TagID "5") with respect to NS "0" is changed to the LUT recovering method. Since the rollback rate of NS "2" is 0.1, which is higher than the rollback rate of NS "1", the cancellation methods of the Atomic Writes (TagID "28" and TagID "10") with respect to NS "2" are not changed.

Here, a method of changing the cancellation method from the LUT update postponing method to the LUT recovering method is not described in detail. For example, it can be achieved by immediately updating the address translation table, based on the update data stored in the update data region of the address translation table. After updating the address translation table, it is possible to assign the region used for storing the update data to another Atomic Write.

If a region for the Atomic Write (TagID "93") which is newly requested is secured in the update data region by changing the cancellation method for another Atomic Write (TagID "5") from the LUT update postponing method to the LUT recovering method, the management unit 1541 selects the LUT update postponing method as the cancellation method for the newly requested Atomic Write (TagID "93") ("4" of FIG. 14).

Here, since only namespace NS "0" has a lower rollback rate than NS "1" and only one Atomic Write (TagID "5") is being performed with respect to NS "0", the management unit 1541 changes the cancellation method from the LUT update postponing method to the LUT recovering method with regard to one Atomic Write (TagID "5"). It is needless to say that multiple namespaces (in which the Atomic Write is being performed) having a lower rollback rate than that of the namespace that is designated by the newly requested Atomic Write may exist, or that multiple Atomic Writes may be performed with respect to the namespace. It is preferable that the management unit 1541 changes the cancellation method from the LUT update postponing method to the LUT recovering method, from the namespaces in an ascending order of rollback rates and from the namespaces in an ascending order of AW amounts, until a region for the newly requested Atomic Write can be secured in the update data region. The ascending order of AW amounts corresponds to an ascending order of processing loads to change the cancellation method from the LUT update postponing method to the LUT recovering method.

Meanwhile, if the region for the newly requested Atomic Write (TagID "93") cannot be secured in the update data region even by changing the cancellation method for another Atomic Write (TagID "5") from the LUT update postponing method to the LUT recovering method, the management unit 1541 selects the LUT recovering method for the newly requested Atomic Write (TagID "93").

In this way, the memory system 10 according to the present embodiment select the cancellation method of the Atomic Write, based on the setting by the host device and the implementation situation of the Atomic Write.

Figure 15:
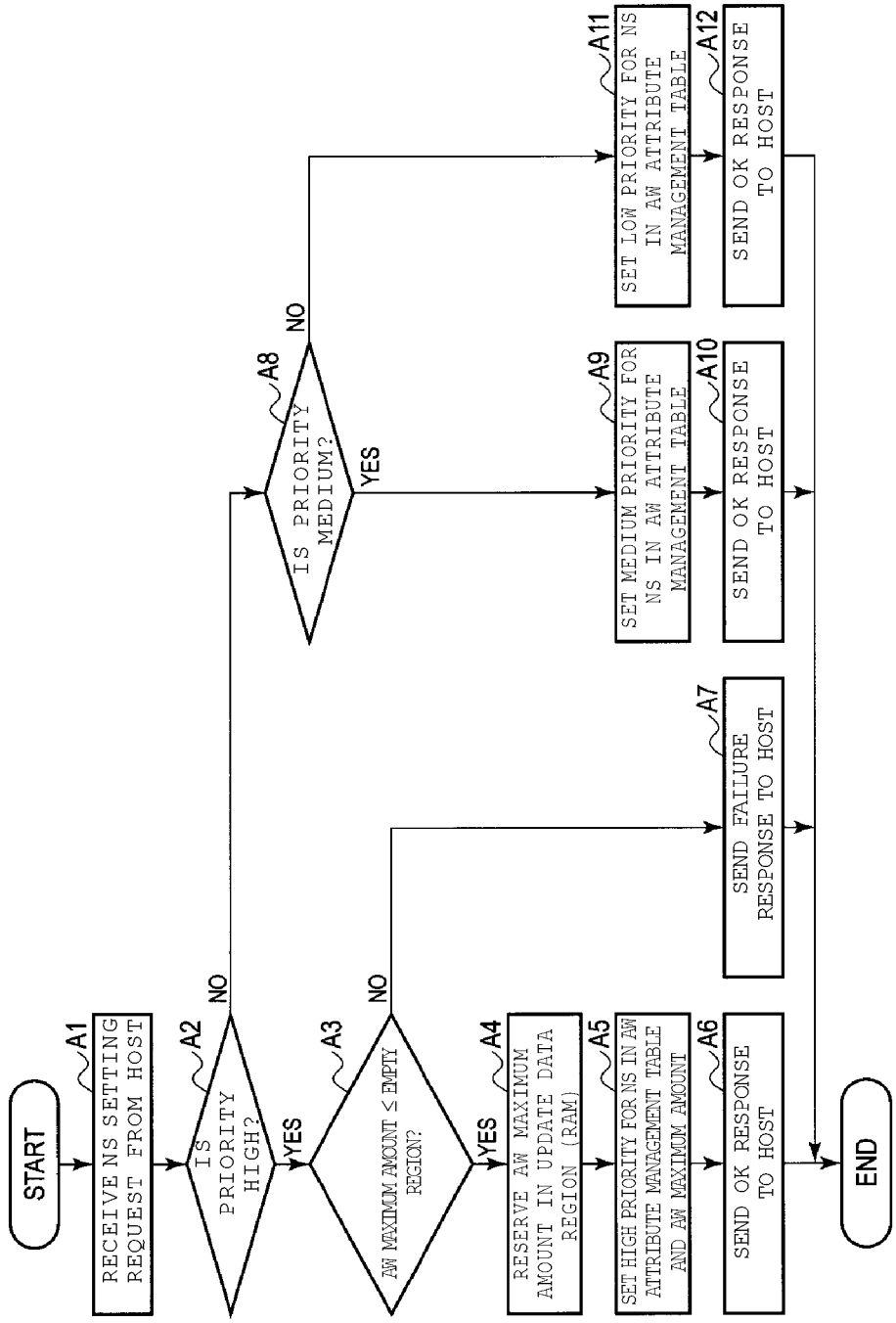
FIG. 15 is a flow chart illustrating a sequence of AW attribute setting processing with respect to a namespace, which is performed in the memory system according to the embodiment.

FIG. 15 is a flow chart illustrating AW attribute setting processing with respect to a namespace, which is performed in the memory system according to the present embodiment.

If the management unit 1541 of the AW processing unit 154 receives a request of AW attribute setting with respect to a certain namespace from the host device (A1), and priority "high" is requested for the cancellation of the Atomic Write (YES of A2), the management unit 1541 determines whether or not an empty region greater than or equal to the capacity (capacity of a region for storing update data of an address translation table regarding the Atomic Write with respect to the namespace: AW maximum amount) which is designated by the host device exists in the update data region of the RAM 14 (A3). The empty region herein is a region other than a region which is secured in advance for another namespace of priority "high". If an empty region exists (YES of A3), the management unit 1541 secures a region for the namespace in the update data region of the RAM 14 (A4), records priority "high" and an AW maximum value in the AW attribute management table 1431 as setting values of the namespace (A5), and sends a response notifying completion of the setting to the host device (A6). If an empty region does not exist (NO of A3), the management unit 1541 sends a response notifying failure of the setting to the host device (A7).

In addition, if priority "medium" is requested (NO of A2 and YES of A8), the management unit 1541 records priority "medium" in the AW attribute management table 1431 as a setting value of the namespace (A9), and sends a response notifying completion of the setting to the host device (A10). Furthermore, if priority "low" is requested (NO of A8), the management unit 1541 records priority "low" in the AW attribute management table 1431 as a setting value of the namespace (A11), and sends a response notifying completion of the setting to the host device (A12).

Figure 16:
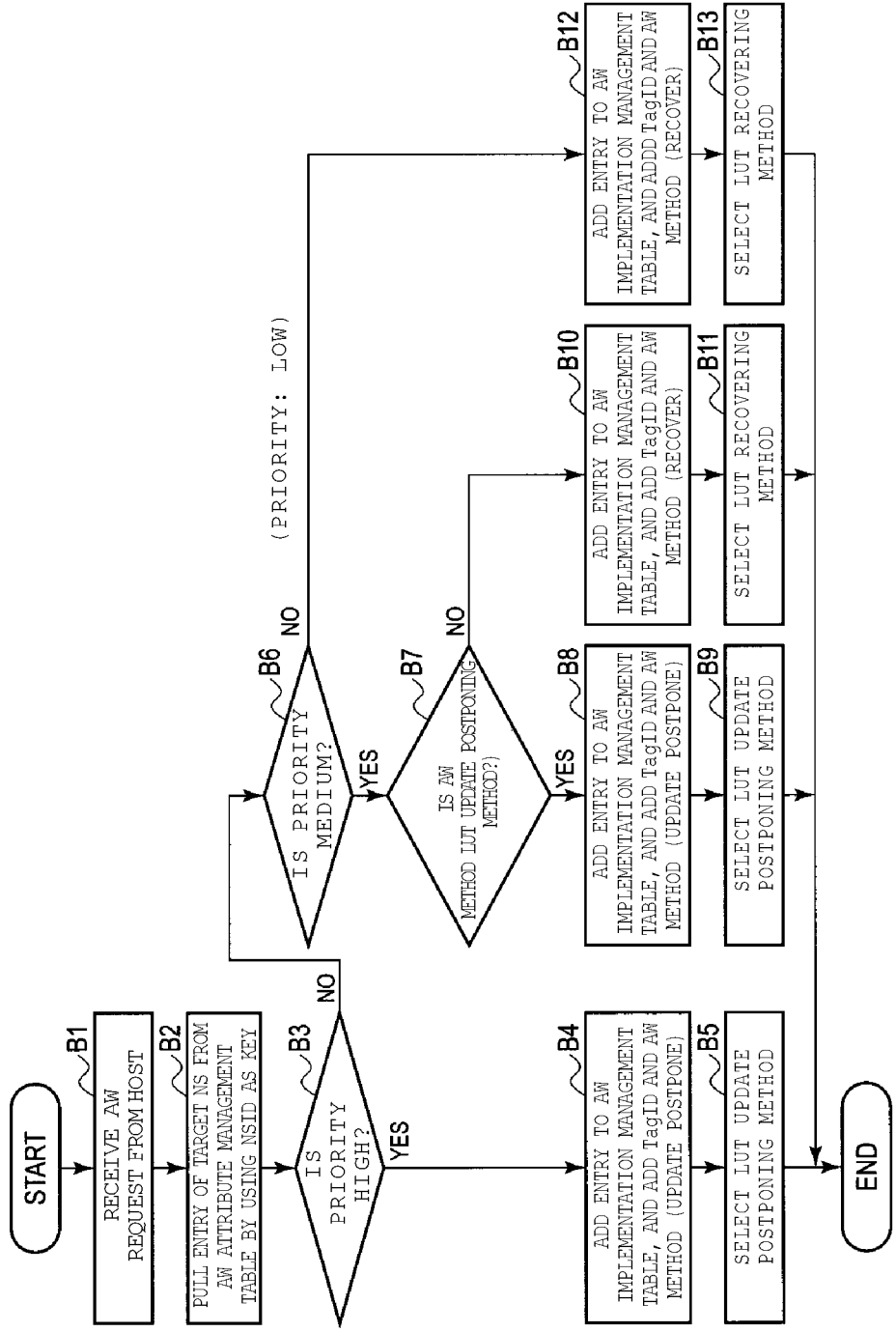
FIG. 16 is a flow chart illustrating an operation sequence carried out when the Atomic Write is started, in the memory system according to the embodiment.

FIG. 16 is a flow chart illustrates an operation sequence when an Atomic Write is started in the memory system according to the embodiment.

If the management unit 1541 of the AW processing unit 154 receives a request for an Atomic Write with respect to a certain namespace from the host device (B1), the management unit 1541 searches for an entry for the namespace from the AW attribute management table 1431 by using NSID included in the request as a key (B2). If priority "high" is set for cancellation of the Atomic Write (YES of B3), the management unit 1541 adds an entry for the Atomic Write to the AW implementation management table 1432, and adds TagID which is the identifier of the request and a value which indicates the LUT update postponing method to the added entry (B4). Then, the management unit 1541 selects the LUT update postponing method as a restoring method of the address translation table in a case in which the Atomic Write is cancelled, and performs the requested Atomic Write (B5).

Figure 17:
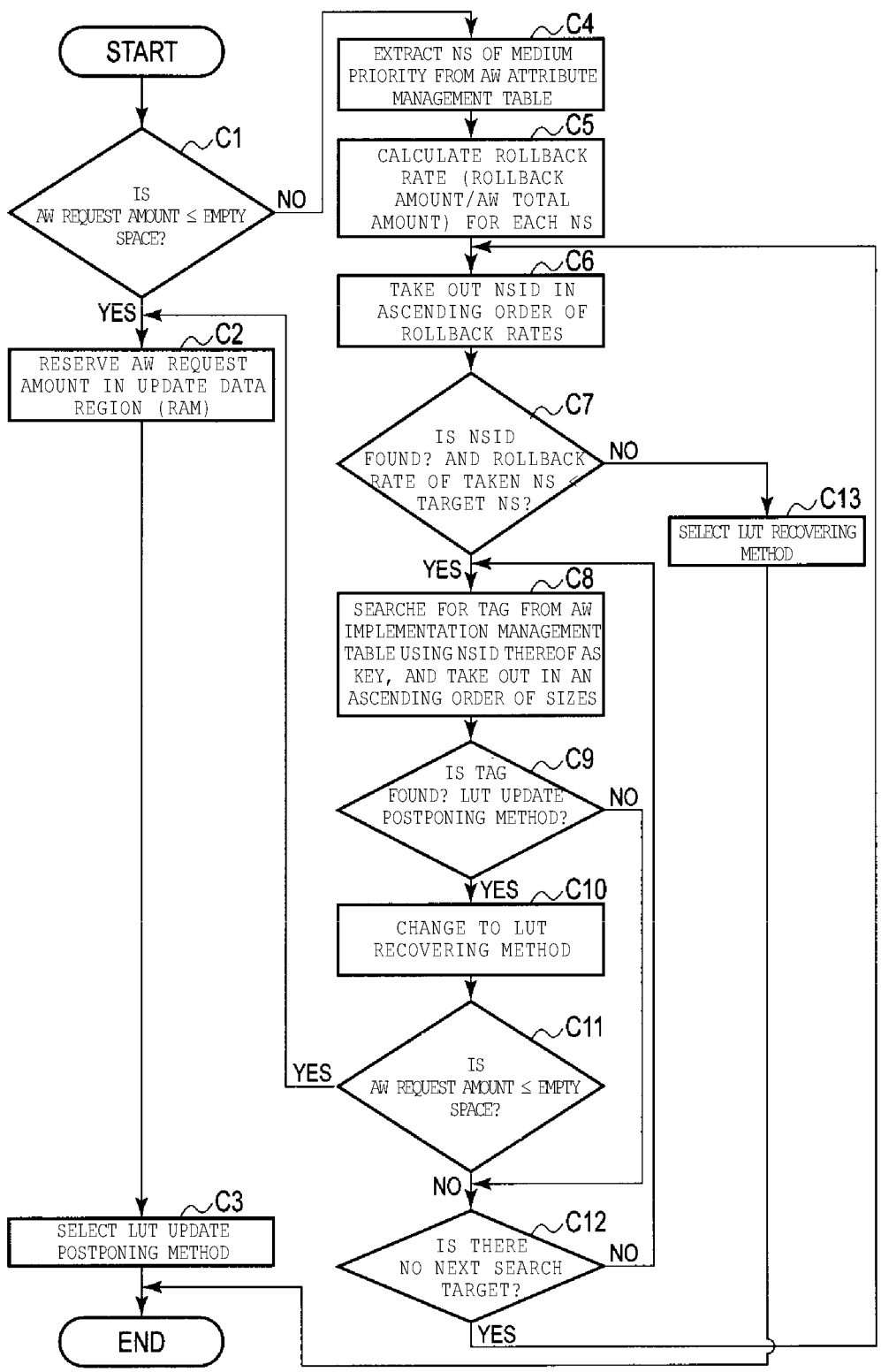
FIG. 17 is a flow chart illustrating a sequence of selecting the LUT update postponing method or the LUT recovering method, which is performed in the memory system according to the embodiment.

If priority "medium" is set (NO of B3 and YES of B6), the management unit 1541 determines which one of the LUT update postponing method and LUT recovering method is applied to cancellation of the Atomic Write, using the sequence illustrated in FIG. 17 (B7). If the LUT update postponing method is selected (YES of B7), the management unit 1541 adds an entry for the Atomic Write to the AW implementation management table 1432, and adds TagID which is the identifier of the request and a value indicating the LUT update postponing method in the added entry (B8). Then, the management unit 1541 selects the LUT update postponing method as a restoring method of an address translation table in a case in which the Atomic Write is cancelled, and performs the requested Atomic Write (B9).

If the LUT recovering method is selected (NO of B7), the management unit 1541 adds an entry for the Atomic Write to the AW implementation management table 1432, and adds TagID which is the identifier of the request and a value indicating the LUT recovering method in the added entry (B10). Then, the management unit 1541 selects LUT recovering method as a restoring method of an address translation table in a case in which the Atomic Write is cancelled, and performs the requested Atomic Write (B11).

If priority "low" is set (NO of B6), the management unit 1541 adds an entry for the Atomic Write to the AW implementation management table 1432, and adds TagID which is the identifier of the request and a value indicating LUT update postponing method in the added entry (B12). Then, the management unit 1541 selects LUT recovering method as a restoring method of an address translation table in a case in which the Atomic Write is cancelled, and performs the requested Atomic Write (B13).

FIG. 17 is a flow chart illustrating a sequence of determining the LUT update postponing method or the LUT recovering method, which is performed in the memory system according to the present embodiment, when the Atomic Write is carried out with respect to the namespace to which priority "medium" is set.

The management unit 1541 of the AW processing unit 154 first determines whether or not an empty region greater than or equal to the capacity (AW requesting amount) necessary for storing update data of the address translation table regarding the Atomic Write exists in the update data region of the RAM 14, when the Atomic Write is carried out with respect to the namespace to which priority "medium" is set for cancellation of the Atomic Write (C1). The empty region herein is a region other than a region which is secured for the namespace of priority "high" and a region which is used for another Atomic Write with respect to the namespace of priority "medium". If an empty region exists (YES of C1), the management unit 1541 secures a region for the Atomic Write in the update data region of the RAM 14 (C2), and determines that the LUT update postponing method is employed for the Atomic Write (C3).

If an empty region does not exist (NO of C1), the management unit 1541 extracts namespaces of priority "medium" from the AW attribute management table 1431 (C4), and calculates a rollback rate for each namespace (C5). The management unit 1541 takes out NSIDs in an ascending order of rollback rates (C6). The management unit 1541 determines whether or not there is a namespace of which rollback rate is lower than that of the namespace of the current Atomic Write target (C7). If the condition is satisfied (YES of C7), the management unit 1541 searches the AW implementation management table 1432 by using the NSID as a key, and takes out TagID in an ascending order of AW amounts (C8).

The management unit 1541 determines whether or not there is a TagID for which the LUT update postponing method is employed (C9). If the condition is satisfied (YES of C9), the management unit 1541 changes the cancellation method of the Atomic Write of the TagID from the LUT update postponing method to the LUT recovering method through the sequence illustrated in FIG. 18 (C10). If an empty region greater than or equal to a capacity necessary for the current Atomic Write exists in the update data region of the RAM 14 (YES of C11), the management unit 1541 secures a region for the Atomic Write in the update data region of the RAM 14 (C2), and determines that the LUT update postponing method is employed for the Atomic Write (C3). If an empty region greater than or equal to the capacity necessary for the current Atomic Write does not exist in the update data region of the RAM 14 even by the change of the cancellation method (NO of C11), or if the LUT recovering method is employed for the Atomic Write of the found TagID (NO of C9), the management unit 1541 determines whether or not another TagID exists in NSID as a target at that time (C12).

If the TagID exists (NO of C12), the management unit 1541 repeats steps from C8, with respect to the Atomic Write having a next smaller AW amount. If the TagID does not exist (YES of C12), the management unit 1541 repeats steps from C6, with respect to the namespace having a next lower rollback rate.

In addition, if the rollback rate of the found NSID is higher than that of the namespace of the current Atomic Write target (NO of C7), the management unit 1541 determines that LUT recovering method is employed for the Atomic Write (C13).

Figure 18:
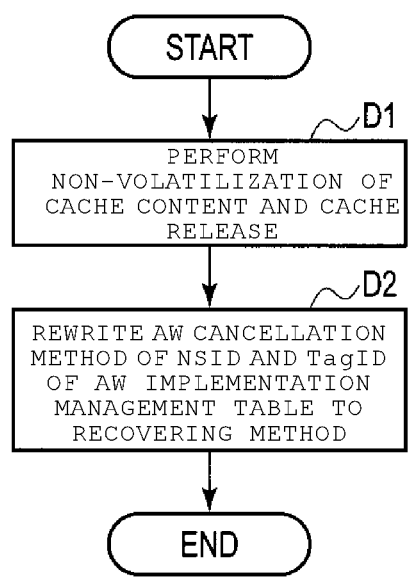
FIG. 18 is a flow chart illustrating a sequence of changing the cancellation method from the LUT update postponing method to the LUT recovering method, which is performed in the memory system according to the embodiment.

FIG. 18 is a flow chart illustrating a sequence of changing the cancellation method from the LUT update postponing method to the LUT recovering method, which is performed in the memory system according to the present embodiment.

The management unit 1541 of the AW processing unit 154 updates the address translation table 1221 of the NAND memory 12, and releases the update data region of the RAM 14 which is secured for the Atomic Write, based on update data that is stored in the update data region of the RAM 14 and of the address translation table regarding the Atomic Write for which cancellation method is changed from LUT update postponing method to LUT recovering method (D1). Subsequently, the management unit 1541 updates the AW implementation management table 1432 such that the corresponding entry associated with the NSID and the TagID to a value indicates the LUT recovering method is employed (D2).

Figure 19:
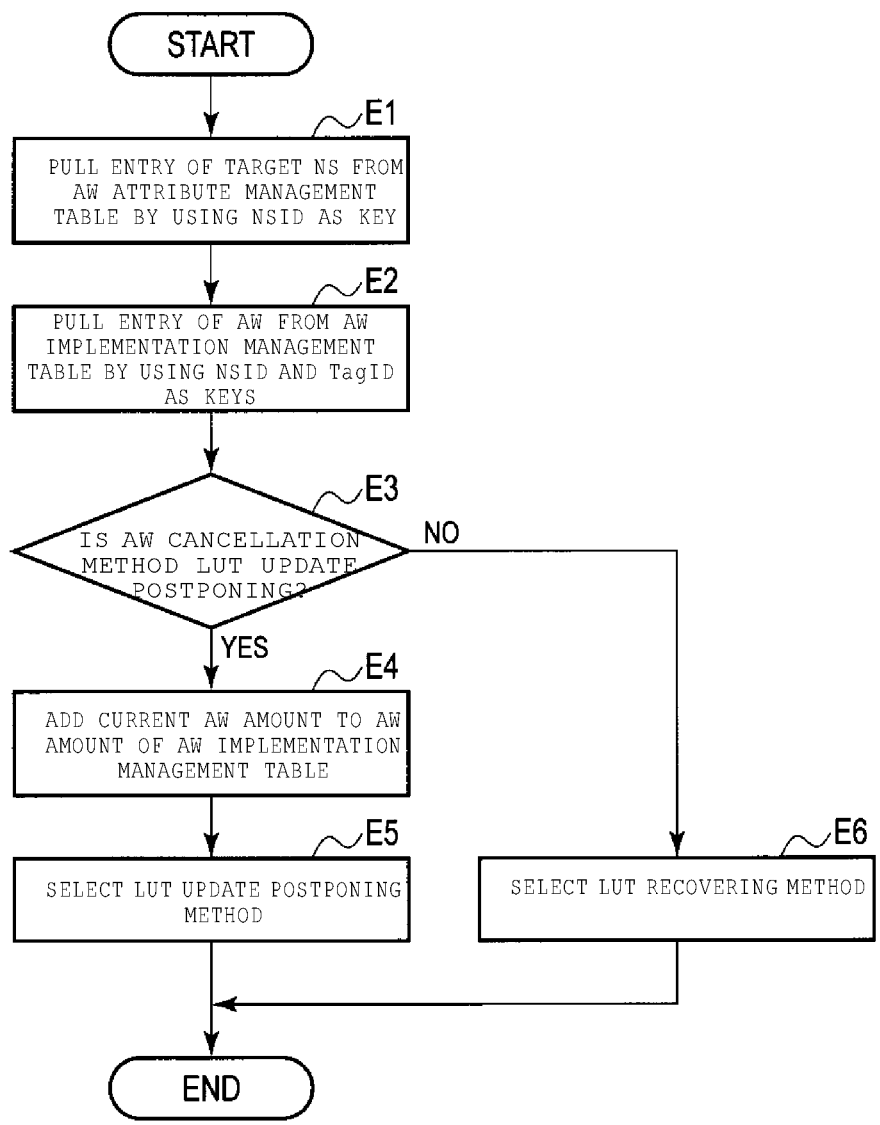
FIG. 19 is a flow chart illustrating an operation sequence during the Atomic Write carried out in the memory system according to the embodiment.

FIG. 19 is a flow chart illustrating an operation sequence during the Atomic Write, which is carried out in the memory system according to the present embodiment.

The management unit 1541 of the AW processing unit 154 searches for an entry for a target namespace from the AW attribute management table 1431 by using NSID included in the command from the host device as a key (E1). In addition, the management unit 1541 searches for an entry for a target Atomic Write from the AW implementation management table 1432 by using the NSID and TagID included in the command as keys (a combination of NSID and TagID becomes an identifier of Atomic Write) (E2).

If the LUT update postponing method is employed for the Atomic Write (YES of E3), the management unit 1541 adds amount of update data of the address translation table which is generated for the current Atomic Write to AW amount recorded in the entry of the searched AW implementation management table 1432 (E4). Then, the management unit 1541 instructs the update postponing control unit 1542 of the AW processing unit 154 to perform processing regarding the Atomic Write (E5). Meanwhile, if the LUT recovering method is employed (NO of E3), the management unit 1541 instructs the recovering control unit 1543 of the AW processing unit 154 to perform processing regarding the Atomic Write (E6).

Figure 20:
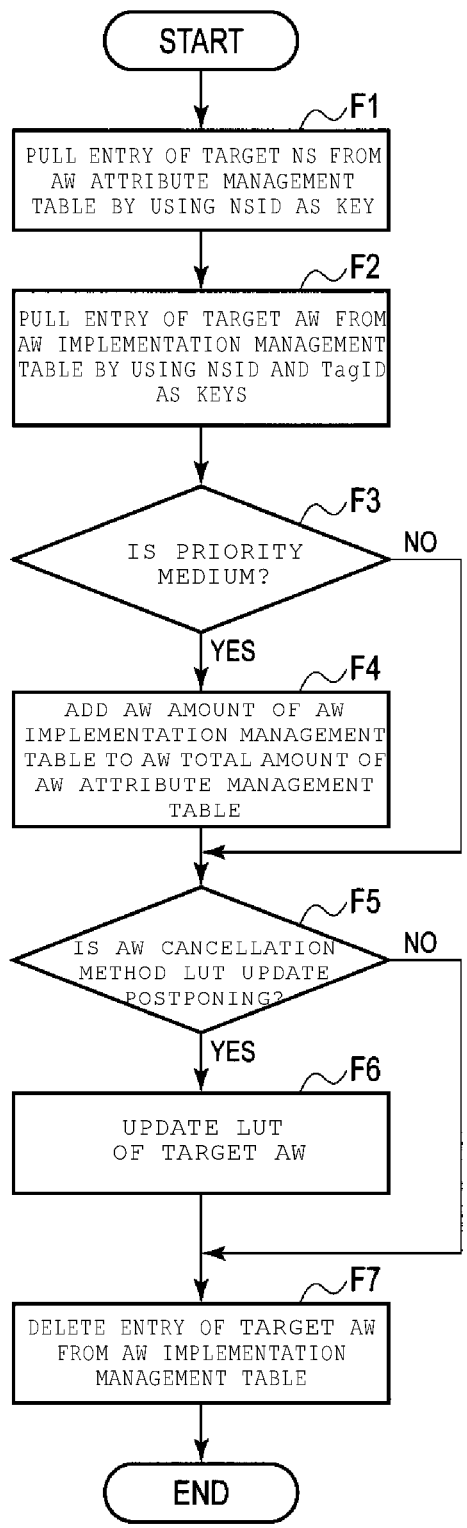
FIG. 20 is a flow chart illustrating an operation sequence carried out at the time of completion of the Atomic Write, in the memory system according to the embodiment.

FIG. 20 is a flow chart illustrating an operation sequence carried out at the time of completion of the Atomic Write in the memory system according to the present embodiment.

The management unit 1541 of the AW processing unit 154 searches for an entry for a target namespace from the AW attribute management table 1431 by using NSID included in the command from the host device as a key (F1). In addition, the management unit 1541 searches for an entry for a target Atomic Write from the AW implementation management table 1432 by using the NSID and TagID included in the command as keys (F2).

If priority "medium" is set to the namespace (YES of F3), the management unit 1541 adds the AW amount which is recorded in the entry of the searched AW implementation management table 1432 to the AW total amount recorded in the entry of the searched AW attribute management table 1431 (F4). If priority "medium" is not set, that is, priority "high" or priority "low" is set (NO of F3), addition of the AW total amount is not performed, and thus, the management unit 1541 omits the step of F4.

In addition, if the LUT update postponing method is employed for the Atomic Write (YES of F5), the management unit 1541 ceases postponement of updating the address translation table regarding the Atomic Write (F6). More specifically, the management unit 1541 updates the address translation table, and releases a region in the update data region of the RAM 14 that is secured for the Atomic Write, based on the update data of the address translation table regarding the Atomic Write. If the LUT update postponing method is not employed, that is, the LUT recovering method is employed (NO of F5), the update data of the address translation table is not stored in the update data region of the RAM 14, and thus, the management unit 1541 omits the step of F6. Then, the management unit 1541 deletes the record for the Atomic Write from the AW implementation management table 1432 (F7).

Figure 21:
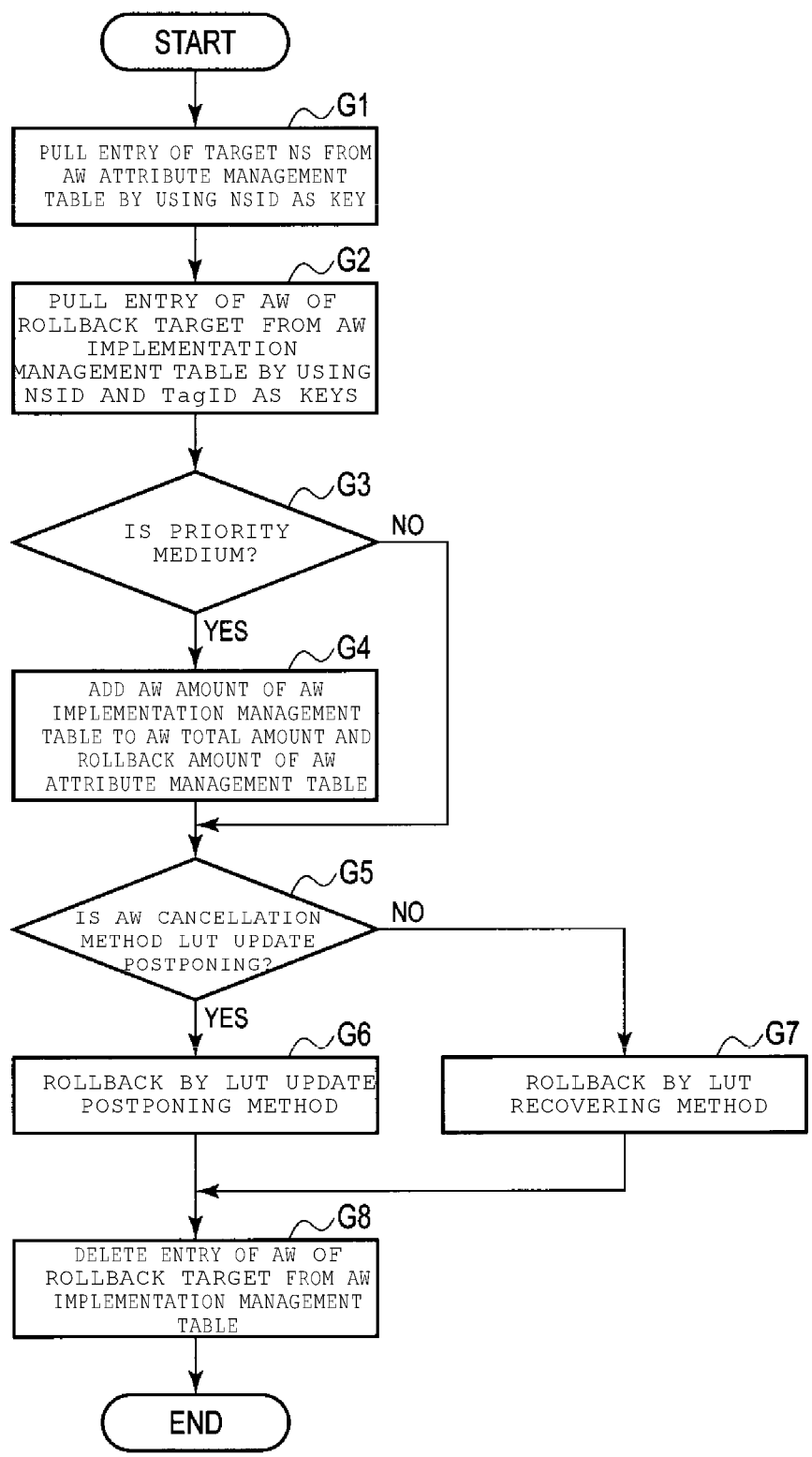
FIG. 21 is a flow chart illustrating an operation sequence carried out at the time of cancellation (rollback) of the Atomic Write, in the memory system according to the embodiment.

FIG. 21 is a flow chart illustrating an operation sequence at the time of Atomic Write cancellation (rollback) of the memory system according to the present embodiment.

The management unit 1541 of the AW processing unit 154 searches for an entry for a target namespace from the AW attribute management table 1431 by using NSID included in the command from the host device as a key (G1). In addition, the management unit 1541 searches for an entry for a target Atomic Write from the AW implementation management table 1432 by using the NSID and TagID included in the command as keys (G2).

If priority "medium" is set to the namespace (YES of G3), the management unit 1541 adds the AW amount which is recorded in the entry of the searched AW implementation management table 1432 to the AW total amount and the rollback amount which are recorded in the entry of the searched AW attribute management table 1431 (G4). If priority "medium" is not set, that is, priority "high" or priority "low" is set (NO of G3), addition of the AW total amount and the rollback amount is not performed, and thus, the management unit 1541 omits the step of G4.

If the LUT update postponing method is employed for the Atomic Write (YES of G5), the management unit 1541 instructs the update postponing control unit 1542 of the AW processing unit 154 to perform cancellation processing of the Atomic Write (G6). Meanwhile, if the LUT recovering method is employed (NO of G5), the management unit 1541 instructs the recovering control unit 1543 of the AW processing unit 154 to perform cancellation processing of the Atomic Write (G7). Then, the management unit 1541 deletes the entry for the Atomic Write from the AW implementation management table 1432 (G8).

As described above, in the memory system according to the present embodiment, if a request from the host device specifies setting regarding cancellation of an Atomic Write (priority "high" or priority "low"), the LUT update postponing method or the LUT recovering method is selected in accordance with the request. If the request does not specify the setting (priority "medium"), the LUT update postponing method or the LUT recovering method is selected in accordance with use situation of an update data region in a RAM or a rollback rate of each namespace. Thus, a preferable method of carrying out the cancellation of the Atomic Write is selected.

Each of the various functions described in the present embodiment may be achieved by a processing circuit. As an example, the processing circuit includes a programmed processor such as a central processing unit (CPU). The processor performs each function described above by executing a program stored in a memory. The processor may be a microprocessor including an electric circuit. As an example, the processing circuit includes a digital signal processing (DSP), an application specific integrated circuit (ASIC), a microcontroller, a controller, and other electric circuit components.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
a non-volatile memory; and
a controller circuit configured to carry out an atomic write operation in the non-volatile memory in response to an atomic write command, and selectively carry out one of a first operation and a second operation relating to address mapping between a logical address targeted by the atomic write command and a physical address of the non-volatile memory, along with the atomic write operation, wherein
when the first operation is carried out, the controller circuit starts to update the address mapping after receiving a notification that writing of all data of the atomic write operation has been completed, and
when the second operation is carried out, the controller circuit starts to update the address mapping before receiving the notification.

2. The memory system according to claim 1, wherein
when the first operation is carried out, the controller circuit starts to update the address mapping by tracking a physical address in which data have been written, separately from the address mapping, and incorporating the tracked physical address in the address mapping, and
when the second operation is carried out, the controller circuit starts to update the address mapping without tracking the physical address separately from the address mapping.

3. The memory system according to claim 2, wherein
when a cancellation command is received while the atomic write operation is being carried out and the first operation is carried out, the controller circuit discards the tracked physical address, and
when the cancellation command is received while the atomic write operation is being carried out and the second operation is carried out, the controller circuit restores the address mapping to a state before the atomic write operation started.

4. The memory system according to claim 3, wherein
the controller circuit restores the address mapping by modifying a part of the address mapping that has been updated through the second operation.

5. The memory system according to claim 3, wherein
the address mapping is stored in a volatile memory and transferred periodically to the non-volatile memory, and
the controller circuit restores the address mapping in the volatile memory, by retrieving an address mapping that has been most recently transferred to the non-volatile memory and updating the retrieved address mapping for all data writing that have been performed except for the atomic write operation.

6. The memory system according to claim 2, wherein
when the atomic write command is for a first namespace, the controller circuit carries out the first operation, and
when the atomic write command is for a second namespace different from the first namespace, the controller circuit carries out the second operation.

7. The memory system according to claim 6, further comprising:

a volatile memory unit having a region for storing the physical address tracked by the controller circuit, wherein
when the atomic write command is for a third namespace different from the first and second namespaces, the controller circuit selectively carries out one of the first operation and the second operation based on a remaining capacity of the region.

8. The memory system according to claim 7, wherein
when the atomic write command is for the third namespace, the controller circuit selectively carries out one of the first operation and the second operation also based on whether an operation that has been carried out for another atomic write operation that is currently being carried out is the first operation or the second operation.

9. The memory system according to claim 8, wherein
when the atomic write command is for the third namespace, the controller circuit selectively carries out one of the first operation and the second operation also based on a probability that said another atomic write operation is cancelled before completion.

10. The memory system according to claim 8, wherein
when the controller circuit selects the first operation and the first operation has been carried out for said another atomic write operation, the controller circuit changes the operation for said another atomic write operation to the second operation.

11. The memory system according to claim 10, wherein
when the controller circuit changes the operation for said another atomic write operation to the second operation, the controller circuit starts to update the address mapping based on a tracked physical address for said another atomic write operation and then discards the tracked physical address.

12. A method for carrying out an atomic write operation with respect to a non-volatile memory, comprising:
starting an atomic write operation in the non-volatile memory, in response to an atomic write command;
selecting one of a first operation and a second operation relating to address mapping between a logical address targeted by the atomic write command and a physical address of the non-volatile memory;
when the first operation is selected, starting to update the address mapping after receiving a notification that writing of all data of the atomic write operation has been completed; and
when the second operation is selected, starting to update the address mapping before receiving the notification.

13. The method according to claim 12, wherein
when the first operation is selected, the updating of the address mapping is carried out by tracking a physical address in which data have been written, separately from the address mapping, and incorporating the tracked physical address to the address mapping, and
when the second operation is selected, the updating of the address mapping is carried out without tracking the physical address separately from the address mapping.

14. The method according to claim 13, further comprising:
receiving a cancellation command while the atomic write operation is being carried out;
when the first operation is selected for the atomic write operation, discarding the tracked physical address in response to the cancellation command; and when the second operation is selected for the atomic write operation, restoring the address mapping to a state before the atomic write operation starts.

15. The method according to claim 14, wherein the address mapping is restored by modifying a part of the address mapping that has been updated through the second operation.

16. The method according to claim 14, wherein the address mapping is stored in a volatile memory and transferred periodically to the non-volatile memory, and
the address mapping in the volatile memory is restored, by retrieving an address mapping that has been most recently transferred to the non-volatile memory and updating the retrieved address mapping for all data writing that have been performed except for the atomic write operation.

17. The method according to claim 13, wherein
when the atomic write command is for a first namespace, the first operation is selected, and
when the atomic write command is for a second namespace different from the first namespace, the second operation is selected.

18. The method according to claim 17, wherein
when the atomic write command is for a third namespace different from the first and second namespaces, one of the first operation and the second operation is selected based on a remaining capacity of a region for storing the tracked physical address.

19. The method according to claim 18, wherein
when the atomic write command is for the third namespace, said one of the first operation and the second operation is selected also based on whether an operation that has been selected for another atomic write operation that is currently being carried out is the first operation or the second operation.

20. The method according to claim 19, wherein
when the atomic write command is for the third namespace, said one of the first operation and the second operation is selected also based on a probability that said another atomic write operation is cancelled before completion.

* * * * *